(12) United States Patent
Kordas

(10) Patent No.: US 6,551,368 B1
(45) Date of Patent: Apr. 22, 2003

(54) DUST FILTER

(75) Inventor: Friedel Kordas, Recklinghausen (DE)

(73) Assignee: Intensiv-Filter GmbH & Co. KG, Velbert (DE)

(*) Notice: Subject to any disclaimer, the term of this patent is extended or adjusted under 35 U.S.C. 154(b) by 0 days.

(21) Appl. No.: 10/110,370

(22) PCT Filed: Oct. 10, 2000

(86) PCT No.: PCT/EP00/09936
§ 371 (c)(1),
(2), (4) Date: Apr. 9, 2002

(87) PCT Pub. No.: WO01/26780
PCT Pub. Date: Apr. 19, 2001

(30) Foreign Application Priority Data

Oct. 11, 1999 (EP) .............................................. 99120244

(51) Int. Cl.⁷ ................................................ B01D 46/04
(52) U.S. Cl. ........................................... 55/302; 95/280
(58) Field of Search ........................ 55/283, 294, 302, 55/293; 95/279, 280

(56) References Cited

U.S. PATENT DOCUMENTS 4,836,834 A * 6/1989 Steele .......................... 55/302
5,116,395 A * 5/1992 Williams ....................... 55/302
6,022,388 A * 2/2000 Anderson et al. ............... 55/302
6,350,290 B1 * 2/2002 Nadeau ........................ 55/302

* cited by examiner

Primary Examiner—David A. Simmons
Assistant Examiner—Minh-Chau T. Pham
(74) Attorney, Agent, or Firm—Gudrun E. Huckett

(57) ABSTRACT

A dust filter has a vertically oriented filter housing and a partition dividing the filter housing into a lower dust-contaminated air chamber and an upper clean air chamber. The partition has a plurality of openings. Self-supporting filter tubes are suspended from the openings and extend into the lower dust-contaminated chamber, wherein the self-supporting filter tubes are open upwardly in a direction toward the clean air chamber. Several self-supporting filter tubes are combined to a filter bundle, respectively, wherein a spacing between the self-supporting filter tubes of each filter bundle is smaller than a spacing of the filter bundles relative to one another. A device for cleaning off dust and product particles adhering to outer surfaces of the self-supporting filter tubes is provided.

22 Claims, 5 Drawing Sheets

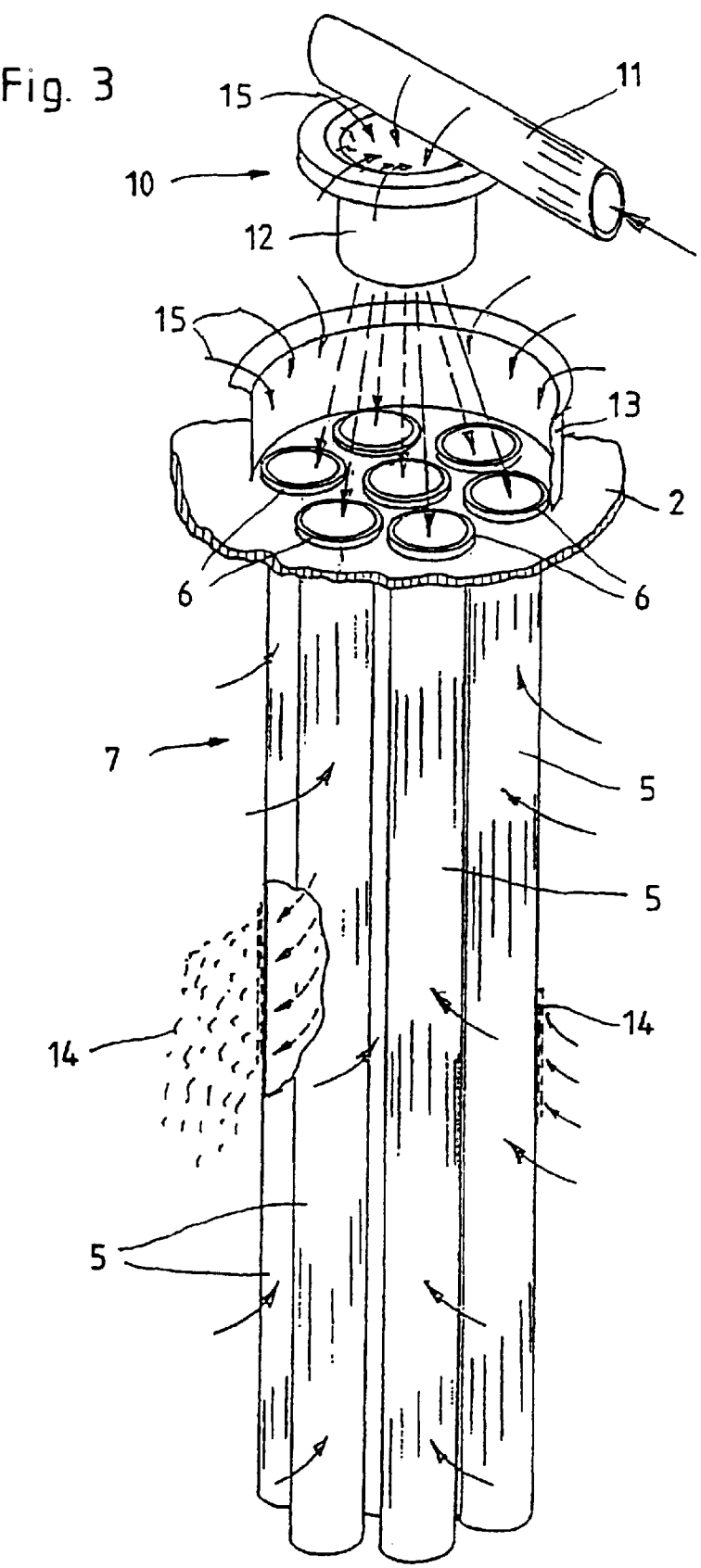

DUST FILTER

Figure 1:
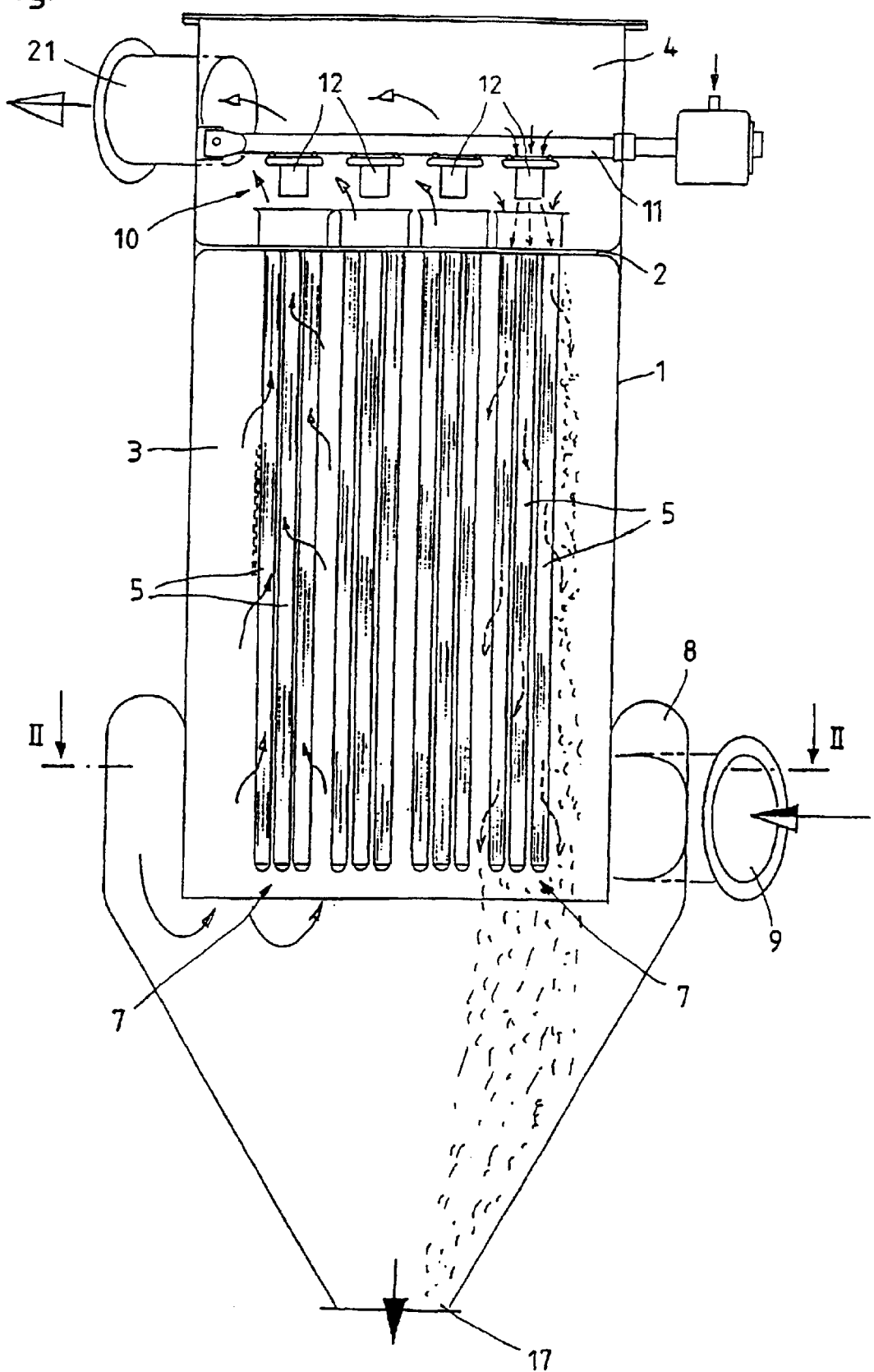

The invention relates to a dust filter with a vertically oriented filter housing and a partition dividing the filter housing into a lower dust-contaminated air chamber and an upper clean air chamber. The partition is provided with a plurality of openings in which self-supporting filter tubes are suspended which are open in the upward direction to the clean air chamber, wherein means are provided to clean off the dust and product particles adhering to the outer surfaces of the filter tubes.

Such a dust filter is known from DE 44 40 279 A1. For dust removal filter elements in the form of filter hoses or filter tubes are often used which have a diameter of approximately 150 mm and a length of 4 m and more. In addition to the filter hoses suspended from the partition by their own weight, it is known to employ self-supporting filter tubes for forming the filter elements. In both cases the material for the filter elements is needled felt. The filter elements are arranged in a dust-contaminated air chamber, and the dust-contaminated air flows through them from the exterior to the interior. Their inner space is in communication with the clean air chamber which is operated at a reduced pressure relative to the dust-contaminated air chamber, and the cleaned gas exits the filter device from the clean air chamber. The dust and product particles which collect on the outer walls of the filter elements form a dust cake whose thickness increases during the course of operation. For this reason, in the known dust-contaminated air filters cleaning means are provided in order to clean off the adhering dust and product particles from the outer surfaces of the filter elements.

For example, it is known to clean the filter elements by means of a compressed air pulse injector systems so that the dust or product particles adhering to the outer side of the hose are blasted off by backwashing with compressed air.

When the dust filters are used in production devices which are employed for different products, it is required to clean off the dust or product residues, which inevitably adhere during the filter process to the filter hoses and inner walls of the filter housing, from the entire dust-contaminated air chamber of the filters, including the filter hoses or filter tubes, such that product corruption and product contamination are prevented in the case of a changeover of a product. Such a hygiene-complying operation is mandatory primarily in the processing of foodstuffs, pharmaceutical and medical products.

For cleaning dust filters it is also known to clean the outer surfaces of the filter hoses or filter tubes as well as the inner side of the filter housing with a washing liquid which is dispensed by washing nozzles arranged in the dust-contaminated air chamber.

The dust filters known in the prior art have the disadvantage that, in addition to requiring a large space for constructive lengths of the filter hoses or filter tubes of more than 4 m length, they can be cleaned in a hygiene-complying way only with great expenditure. The filter materials employed in the known dust filters have a thickness of approximately 1.5 to 2 mm for ensuring a sufficient mechanical strength. This relatively thick porous material will become saturated with washing liquid during the washing process and must be dried in a time-consuming drying process before reusing the dust filter.

Based on this, the object of the invention is to further develop a dust filter of the aforementioned kind such that the dust filter, while requiring only minimal space, requirement enables a simple and quick cleaning of the filter elements.

The solution to this object is characterized according to the invention in that several filter tubes are combined to a filter bundle wherein the spacing between the individual filter tubes of each filter bundle is smaller than the spacing between individual filter bundles relative to one another.

Combining several filter tubes with a diameter of less than 100 mm, preferably 40 to 50 mm, to a filter bundle allows to reduce the constructive length of the filter tubes to less than 4 m, preferably approximately 2 m. The material for the filter tubes is preferably a self-supporting needled felt with a very smooth surface, high air permeability, and a wall thickness of less than 1 mm, preferably approximately 0.6 mm. In this way it is possible to achieve that, by means of the filter bundles that are relatively short in comparison to the prior art, a throughput of air to be filtered can be achieved which compares to that of the very long filter tubes known in the prior art.

According to a preferred embodiment of the invention, a compressed air source of a compressed air pulse injector system is arranged as a cleaning means in the clean air chamber above each filter bundle in order to remove by compressed air pulses the dust and product particles adhering to the outer surface of the filter tubes. In this connection, by combining several filter tubes to a filter bundle it is sufficient to provide only one compressed air source for each filter bundle.

In order to concentrate the compressed air pulses ejected by the compressed air pulse injector system onto the individual filter tubes of a filter bundle, it is moreover suggested that each filter bundle at the top side of the partition is surrounded by a catch nozzle enveloping the filter tubes of the respective filter bundle. With this catch nozzle, whose inner diameter is advantageously somewhat greater than a diameter of a trace circle surrounding the filter tubes of the filter bundle, the compressed air pulses applied by the compressed air source are directed in a targeted way into the individual filter tubes of each filter bundle so that the backwashing action of the compressed air pulses is enhanced.

The air throughput upon backwashing of the filter tubes by means of the compressed air pulse injector system can be increased moreover in that the compressed air cleaning of the filter tubes is realized in addition by means of secondary air that is taken in at least in one area of the injector system. This secondary air is taken in and entrained by means of the compressed air pulses ejected by the compressed air source so that the total air throughput upon backwashing of the filter tubes is comprised of the compressed air of the compressed air source as well as the additionally taken in secondary air.

Particularly when employing dust filters according to the invention in processing of foodstuffs and/or medical and pharmaceutical products, it is unavoidable to perform also a complete cleaning and removal of the separated dust and product particles in the dust-contaminated air chamber. For this purpose, washing nozzles for a directed dispensing of washing liquid are provided in the dust-contaminated air chamber as cleaning means for cleaning the filter tubes wherein the washing nozzles are arranged at the points of intersection of diagonals extending from the center points of neighboring filter bundles.

With this arrangement of the washing nozzles, which end preferably flush with the underside of the partition and from which the washing liquid exits essentially radially, it is ensured according to a preferred embodiment of the invention that the washing liquid flows through the individual passages between the filter bundles as well as between the filter tubes of a filter bundle as well as impinges on the outer surface of the filter tubes. With this arrangement according to the invention of the washing nozzles, a complete cleaning of the outer surfaces of the filter tubes of each filter bundle is ensured.

For a complete cleaning of the dust-contaminated chamber it is furthermore suggested that the washing nozzles are arranged such that the washing liquid exiting from the washing nozzles cleans the inner side of the filter housing.

According to a practical embodiment of the invention, the filter housing is surrounded in the lower area of the filter tubes at the outer side by an annular channel into which a dust-contaminated air supply channel opens tangentially for supplying the dust-contaminated air into the filter housing. With this indirect introduction of the dust-contaminated air into the filter housing by means of the annular channel surrounding the filter housing, the mechanical damage of the material of the filter tubes, known in the prior art in the case of direct introduction of dust-contaminated air into the cylinder housing, is avoided. Moreover, this indirect introduction of the dust-contaminated air has the advantage that the speed of the dust-contaminated air to be introduced must not be reduced by suitable constructive measures because the risk of damages of the filter elements is not present.

For obtaining a complete cleaning of the entire filter housing, it is furthermore suggested that also in the area of the entry of the dust-contaminated air into the annular channel from the dust-contaminated air supply channel and/or in the annular channel at least one washing nozzle is provided for a directed dispensing of washing liquid. Only by means of this additional arrangement of washing nozzles in the area of the dust-contaminated air supply it can be ensured that the dust or product residues of the previous product are completely removed from the filter housing beforehand in the case of a product changeover.

According to a practical embodiment of the invention, the dispensing of the washing liquid via the washing nozzles is realized by means of a washing system comprising several liquid circuits. By distributing the washing liquid into different liquid circuits, the washing liquid can be supplied in a directed way into individual washing nozzles in different sections of the filter housing. The control of the liquid circuits and the washing system is realized advantageously by a washing program control.

Finally, it is proposed with the invention to form a filter bundle of seven filter tubes.

Figure 2:
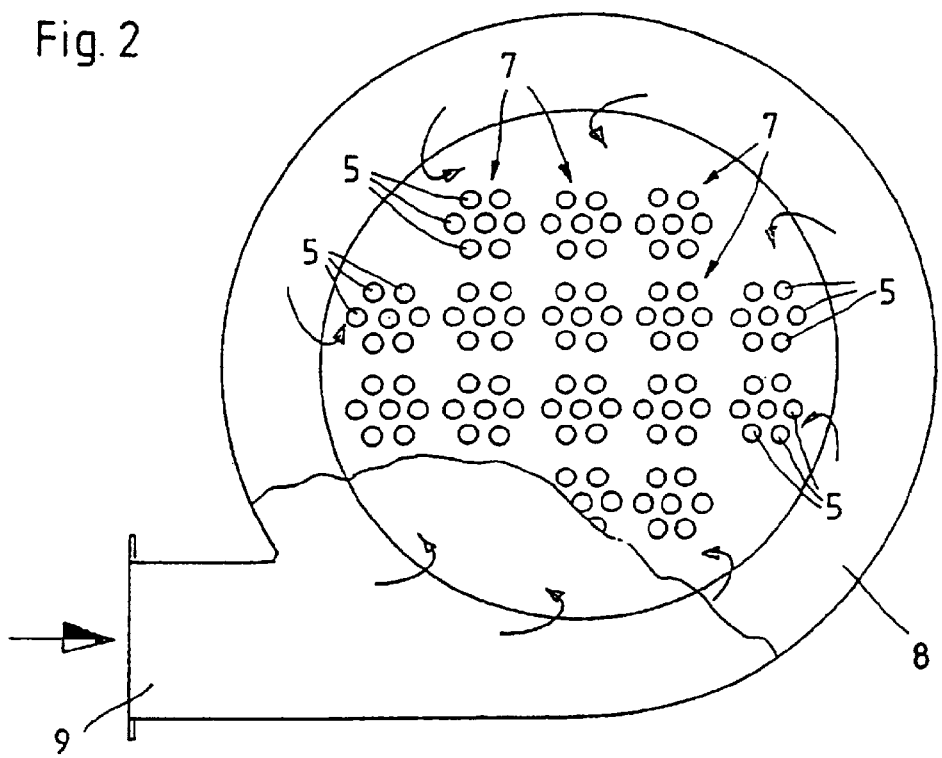
Figure 5:
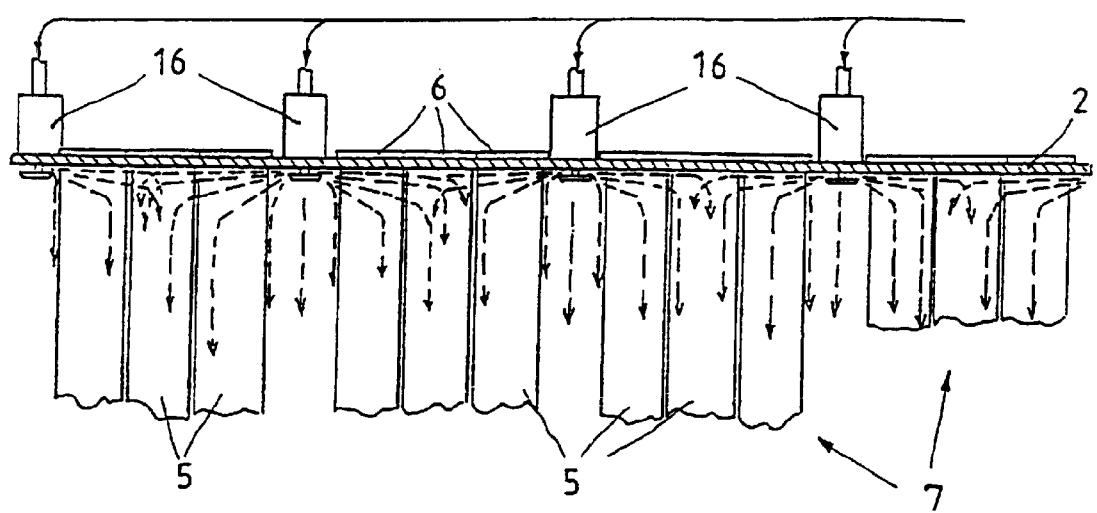
Figure 4:
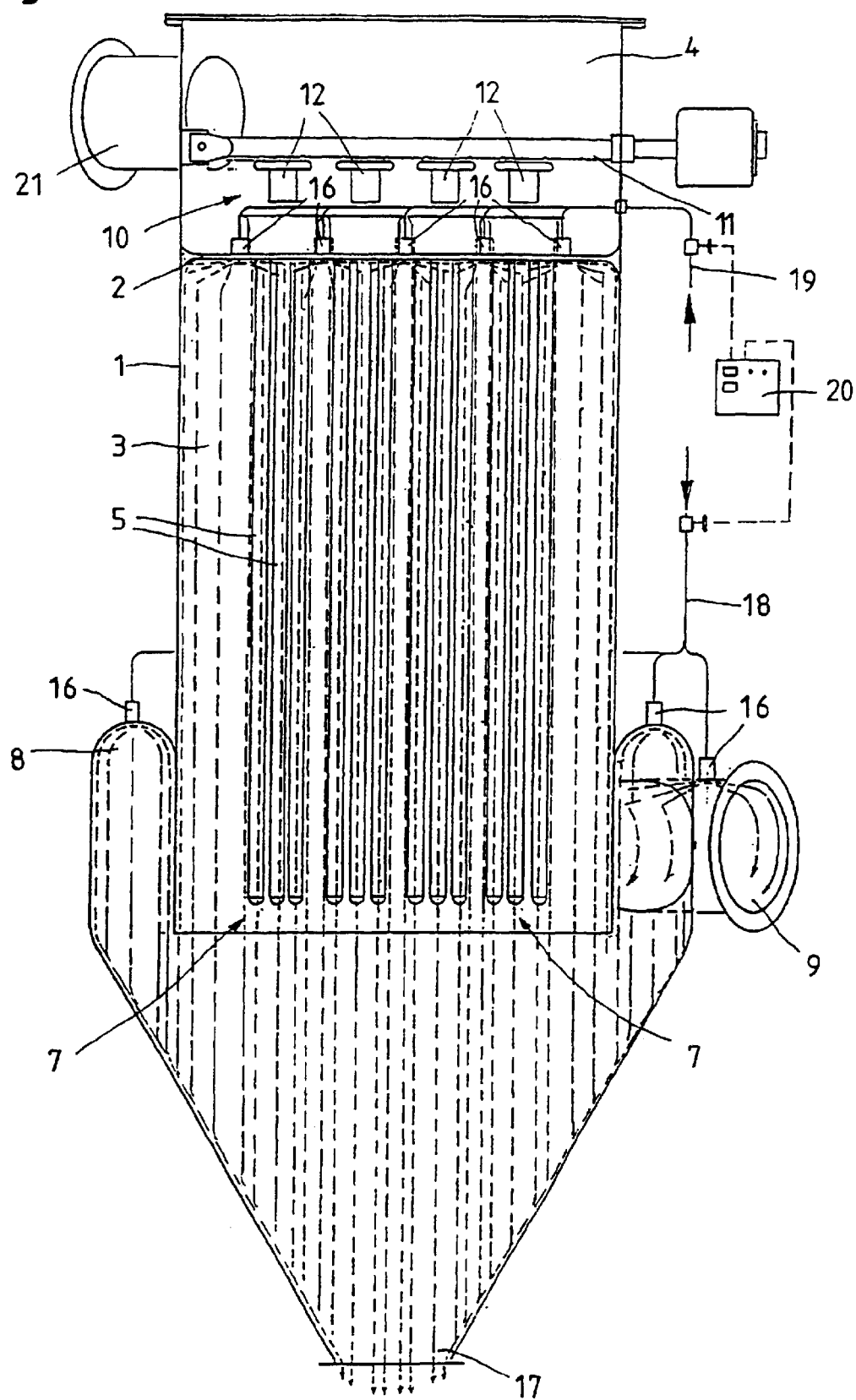
Figure 6:
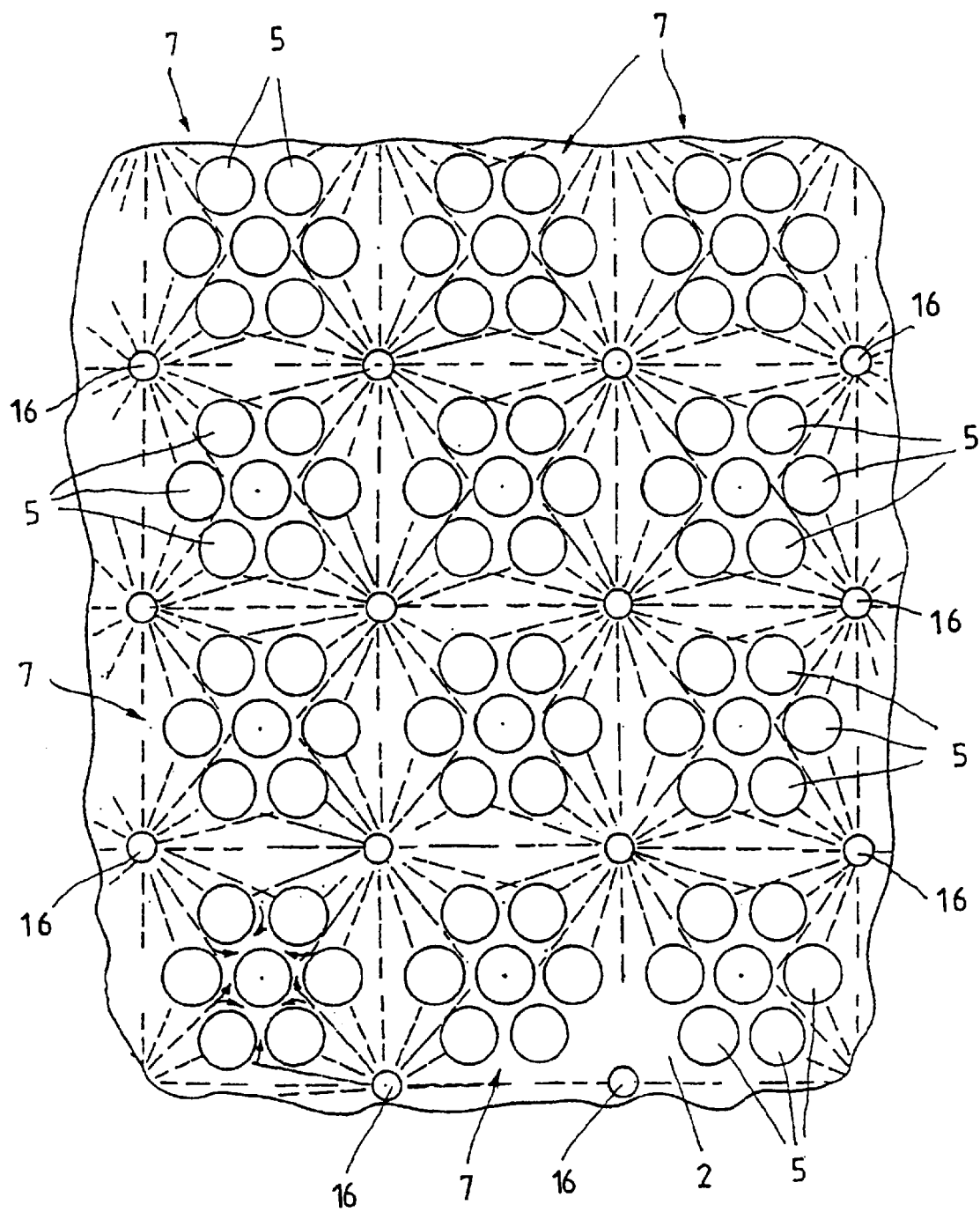

Further features and advantages of the invention result from the following description of the corresponding drawing in which one embodiment of a dust filter according to the invention is illustrated. It is shown in the drawing:

FIG. 1 a longitudinal section of a dust filter according to the invention;

FIG. 2 a cross-section of the filter housing taken along the section line II—II according to FIG. 1;

FIG. 3 a separate perspective view of an individual filter bundle with correlated compressed air pulse injector system;

FIG. 4 a longitudinal section of the dust filter according to FIG. 1 with illustration of the washing nozzles and of the washing water flow;

FIG. 5 an enlarged detail illustration of the dust filter according to FIG. 4 in the area of the partition; and FIG. 6 a view of the partition from below with the filter bundles and washing nozzles arranged therein.

The dust filter illustrated in a complete view in FIG. 1 is comprised of a vertically oriented cylindrical filter housing 1 which is divided by a horizontally positioned partition 2 into a lower dust-contaminated air chamber 3 and an upper clean air chamber 4.

The partition 2 is configured similar to a tube bottom and comprises a plurality of openings with elongate filter elements inserted therein. The illustrated filter elements are filter tubes 5. The self-supporting filter tubes 5 provided at their upper open end with an annular flange 6 are suspended in the openings of the partition 2 such that they are supported by means of the flange 6 on the top side of the partition 2. The effective filter surface is formed by a mantle surface of the filter tubes 5 which are cylindrical in the embodiment.

As shown in particular in FIG. 2, several filter tubes 5 are arranged relative to one another such that together they form a filter bundle 7. In the illustrated embodiment seven filter tubes 5 form a filter bundle 7 wherein the spacing between the individual filter tubes 5 of each filter bundle 7 is smaller than the spacing of the individual filter bundles 7 relative to one another.

In the area of the lower end of the filter tubes 5 or the filter bundle 7 an annular channel 8 is arranged on the outer side of the filter housing 1, wherein a dust-contaminated air supply channel 9 for supplying the dust-contaminated air opens tangentially into the annular channel. The tangential inlet of the dust-contaminated air supply channel 9 into the annular channel 8 is illustrated, in particular, in the sectional view according to FIG. 2.

For cleaning the individual filter tubes 5 of the filter bundles 7 by means of compressed air, a compressed air source 10 of a compressed air pulse injector system, which is required for cleaning off the dust or product filtered out during the filtering process from the filter tubes 5, is arranged in the clean air chamber 4 above each filter bundle 7. Such an arrangement is illustrated in FIG. 3. The compressed air, which is supplied by a compressed air line 11 to an injector 12, flows out of the injector 12 in a targeted way into the upwardly open filter tubes 5 of the filter bundle 7. In order to concentrate the compressed air exiting from the injector 12 onto the filter tubes 5 of the respective filter bundle 7, each filter bundle 7 is surrounded at the top side of the partition 2 by a catch nozzle 13 surrounding all filter tubes 5 of the respective filter bundle 7. As illustrated in the drawing, the inner diameter of the catch nozzle 13 is somewhat greater than the diameter of the trace circle encircling the filter tubes 5 of the filter bundle 7.

The dust cake 14 adhering to the outer surface of the filter tubes 5 is essentially blasted off the outer side of the filter tubes 5 by means of the compressed air pulses introduced into the filter tubes 5 via the injector 12, as is illustrated in the left half of the drawing FIG. 3.

As is illustrated also in FIG. 3, the air throughput for backwashing and cleaning of the filter tubes 5 is increased in that, upon introduction of the compressed air via the injector 12 into the filter tubes 5, secondary air 15 is taken in by the compressed air and entrained. In the illustrated embodiment, the secondary air 15 is taken in at two locations, i.e. in the area of the introduction of the compressed air from the compressed air line 11 into the injector 12 and also in the inflow area of the compressed air entering the catch nozzle 13 from the injector 12.

In addition to the openings for the filter tubes 5, the partition 2 also has further openings into which the washing nozzles 16 are inserted, as is illustrated, in particular, in the FIGS. 4 and 5. As shown in FIG. 6, the washing nozzles 16 are arranged in the partition 2 on points of intersection of diagonals which extend from the center points of neighboring filter bundles 7. The washing nozzles 16 are arranged such within the partition 2 that the exit openings of the washing nozzles 16 end flush with the underside of the partition 2. The washing liquid exiting substantially radially leaves the washing nozzles 16 with such an orientation that the washing liquid flows through the individual passages between the filter bundles 7 as well as between the filter tubes 5 of a filter bundle 7 and impacts on the outer surfaces of the filter tubes 5. As a result of the washing liquid flowing down on the outer side of the filter tubes 5, the dust cake 14 adhering to the outer side of the filter tubes 5 is washed off and is removed together with the washing water via the washing water exit 17 from the filter housing 2. In addition to the cleaning of the outer sides of the filter tubes 5, cleaning of the inner side of the filter housing 1 is also realized by means of the washing liquid exiting from the washing nozzles 16. The course of the washing liquid flow is illustrated in an exemplary fashion in FIG. 4.

In order to achieve a complete cleaning of the entire filter housing 1, in addition to the arrangement of the washing nozzles 16 in the partition 2, washing nozzles 16 are also provided in the area of the dust-contaminated air supply in the illustrated embodiment, i.e., in the dust-contaminated air supply channel 9 as well as in the annular channel 8. The washing liquid for the washing nozzles 16 arranged in the partition 2, on the one hand, and for the washing nozzles 16 arranged in the annular channel 8 and the dust-contaminated air supply channel 9, on the other hand, is provided by separate liquid circuits 18, 19, wherein the control of the two liquid circuits of the washing system is realized by a washing program control 20.

A dust air filter embodied in this way is operated and cleaned as follows.

The dust-contaminated air is supplied to the filter housing 1, divided into a clean air chamber 4 and into a dust-contaminated air chamber 3, via the dust-contaminated air supply channel 9 which opens tangentially into the annular channel 8 which is arranged in the lower area of the filter tubes 5 or the filter bundles 7 at the outer side of the filter housing 1. As a result of the pressure in the clean air chamber 4 being smaller in comparison to that in the dust-contaminated air chamber 3, the dust-contaminated air introduced into the dust-contaminated air chamber 3 flows through the filter tubes 5 of the filter bundles 7 from the exterior to the interior. The gas which is cleaned in this way enters the clean air chamber 4 and exits the filter housing 1 via the gas exit 21.

During the filtering process the dust and product particles to be separated deposit as a dust cake 14 on the outer surface of the filter tubes 5. Since during the course of the operation the thickness of the filter cake increases further and in this way the air throughput through the filter tubes comprised of porous needled felt is significantly limited, it is necessary to remove the dust cake 14 adhering to the outer sides of the filter tubes 5 from time to time.

The removal of the filter cake 14 is realized, on the one hand, by backwashing of the filter tubes 5 by means of compressed air via the compressed air source 10 arranged above each filter bundle 7. As already described supra and illustrated in FIG. 3, the dust cake 14 is essentially blasted off the outer surface of the filter tubes 5 by the compressed air pulses applied by the injector 12.

In order to enable for a product changeover a complete cleaning of the filter housing so as to prevent product contamination, as is required particularly for processing foodstuffs and/or pharmaceutical and medical products, washing nozzles 16 are arranged additionally in the dust-contaminated air chamber 3 of the filter housing 1 via which washing liquid can be applied in a directed way. By means of this washing liquid, the dust and product particles are cleaned off the outer surfaces of the filter tubes 5 as well as the inner side of the filter housing 1.

By employing a self-supporting material for constructing the filter tubes 5, which material has excellent air-permeability properties and enables the realization of self-supporting filter tubes 5 with a wall thickness of less than 1 mm, preferably 0.6 mm, the material of the filter tubes 5 will absorb only a minimal amount of washing liquid during the washing process so that a dust filter configured in this way is dry again to such an extent after a short period of time after the washing process that a new filtering process can be started.

By combining several filter tubes 5 to a filter bundle 7, wherein the diameter of the individual filter tubes 5 will preferably be only 40 to 50 mm, it is possible to reduce the length of the filter tubes significantly, in comparison to the known filter tubes or filter hoses of the prior art, while maintaining the same air throughput. In general, it is sufficient to configure filter tubes of a length of approximately two meters, while in the prior art the conventional lengths of the filter tubes is four meters and more.

List of Reference Numerals 1 filter housing
2 partition
3 dust-contaminated air chamber
4 clean air chamber
5 filter tube
6 flange
7 filter bundle
8 annular channel
9 dust-contaminated air supply channel
10 compressed air source
11 compressed air line
12 injector
13 catch nozzle
14 dust cake
15 secondary air
16 washing nozzle
17 washing water exit
18 liquid circuit
19 liquids circuit
20 washing program control
21 gas exit

What is claimed is:

1. A dust filter comprising:

a vertically oriented filter housing (1);

a partition (2) dividing the filter housing (1) into a lower dust-contaminated air chamber (3) and an upper clean air chamber (4), wherein the partition (2) has a plurality of openings;

self-supporting filter tubes (5) suspended from the openings and extending into the lower dust-contaminated chamber (3), wherein the self-supporting filter tubes (5) are open upwardly in a direction toward the clean air chamber (4);

wherein several self-supporting filter tubes (5) are combined to a filter bundle (7), respectively, wherein a spacing between the self-supporting filter tubes (5) of each one of the filter bundles (7) is smaller than a spacing of the filter bundles (7) relative to one another; and means (10, 16) for cleaning off dust and product particles adhering to outer surfaces of the self-supporting filter tubes (5);

wherein the means for cleaning comprises a compressed air pulse injector having compressed air sources (10) arranged in the clean air chamber (4) above the filter bundles (7), respectively, and configured to remove by compressed air pulses the dust and product particles adhering to the outer surfaces of the filter tubes (5); and catch nozzles (13) arranged at a top side of the partition and surrounding the self-supporting filter tubes (5) of the filter bundles (7), respectively, wherein the catch nozzles (13) are configured to concentrate the compressed air of the compressed air pulse injector system onto the self-supporting filter tubes (5) of the filter bundles (7).

2. The dust filter according to claim 1, wherein the inner diameter of the catch nozzles (13) is greater than the diameter of a trace circle encircling the self-supporting filter tubes (5) of the filter bundles (7).

3. The dust filter according to claim 1, wherein the means for cleaning further comprises a flow of secondary air (15) taken in at least in one area of the compressed air pulse injector system.

4. The dust filter according to claim 1, wherein the means for cleaning further comprises first washing nozzles (16) configured for a directed dispensing of washing liquid in the dust-contaminated air chamber (3) for cleaning the self-supporting filter tubes (5), wherein the washing nozzles (16) are arranged on points of intersection of diagonals extending between center points of neighboring filter bundles (7).

5. The dust filter according to claim 4, wherein the washing nozzles (16) have exit openings ending flush with an underside of the partition (2) and wherein the washing liquid exits substantially radially from the washing nozzles (16) such that the washing liquid flows through individual passages between the filter bundles (7) as well as between the self-supporting filter tubes (5) of the filter bundles (7) and impacts on the outer surfaces of the filter tubes (5).

6. The dust filter according to claim 4, wherein the washing liquid exiting from the washing nozzles (16) cleans an inner side of the filter housing (1).

7. The dust filter according to claim 4, further comprising at least one second washing nozzle (16) arranged at a lower part of the filter housing (1) and configured for a directed dispensing of washing liquid.

8. The dust filter according to claim 4, further comprising:
   an annular channel (8) surrounding an outer side of the filter housing (1) in a lower area of the filter bundles (7); and
   a dust-contaminated air supply channel (9) opening tangentially into the annular channel (8).

9. The dust filter according to claim 8, wherein the at least one second washing nozzle (16) is arranged in an area where dust-contaminated air coming from the dust-contaminated supply channel (9) enters the annular channel (8).

10. The dust filter according to claim 8, wherein the at least one second washing nozzle (16) is arranged in the annular channel (8) and in an area where dust-contaminated air coming from the dust-contaminated supply channel (9) enters the annular channel (8).

11. The dust filter according to claim 8, wherein the at least one washing nozzle (16) is arranged in the annular channel (8).

12. The dust filter according to claim 7, comprising a washing system comprised of several liquid circuits (18, 19) for supplying the first and second washing nozzles (16) with the washing liquid.

13. The dust filter according to claim 12, wherein the washing system comprises a washing program control (20).

14. The dust filter according to claim 13, wherein the self-supporting filter tubes (5) are comprised of a self-supporting needled felt having a smooth surface, a high air permeability, and a wall thickness of less than 1 mm.

15. The dust filter according to claim 14, wherein the wall thickness is approximately 0.6 mm.

16. The dust filter according to claim 1, wherein the self-supporting filter tubes (5) have a diameter of less than 100 mm.

17. The dust filter according to claim 16, wherein the diameter is 40 to 50 mm.

18. The dust filter according to claim 1, wherein the self-supporting filter tubes (5) have a length of less than 4 m.

19. The dust filter according to claim 18, wherein the length is approximately 2 m.

20. The dust filter according to claim 1, wherein seven of the self-supporting filter tubes (5) form one of the filter bundles (7), respectively.

21. The dust filter according to claim 20, wherein a trace circle of the filter bundles (7) is less than 200 mm.

22. The dust filter according to claim 21, wherein the trace circle is approximately 170 mm.

* * * * *